March 22, 1949.　　　　H. H. JONES　　　　2,465,020
PROCESS FOR TREATING MATERIALS
WITH A VOLATILE TREATING AGENT
Filed Feb. 6, 1946
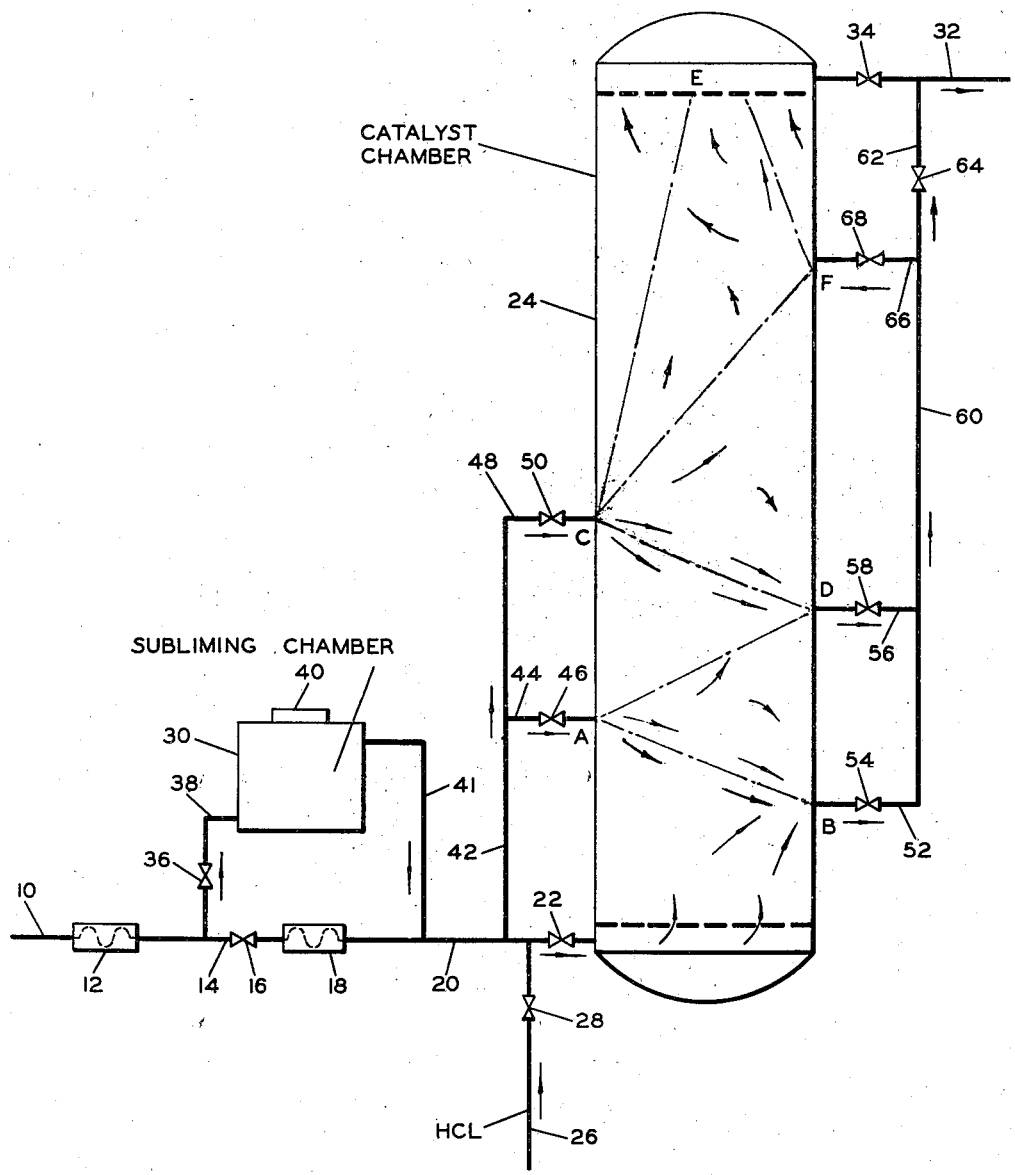
INVENTOR.
H. H. JONES
BY Hudson & Young
ATTORNEYS Patented Mar. 22, 1949

2,465,020

UNITED STATES PATENT OFFICE 2,465,020

PROCESS FOR TREATING MATERIALS WITH A VOLATILE TREATING AGENT

Herbert H. Jones, Bartlesville, Okla., assignor to Phillips Petroleum Company, a corporation of Delaware Application February 6, 1946, Serial No. 645,932

4 Claims. (Cl. 260—683.5)

This invention relates to the impregnation of solid adsorbents, and use of the impregnated adsorbents to treat fluids. In one specific aspect it relates to the catalytic conversion of organic materials. In a preferred embodiment the invention relates to conversion of hydrocarbons in the vapor phase over a Friedel-Crafts type metal halide catalyst supported on an adsorptive material.

The conversion of hydrocarbons over catalysts of the type mentioned has become a familiar commercial process. For economic reasons, aluminum chloride is usually the metal halide employed, although other metal halides such as the chlorides, bromides and occasionally the iodides of zinc, tin, arsenic, antimony, zirconium, beryllium, titanium, iron, molybdenum, boron and the like have also been suggested. Among the reactions catalyzed may be mentioned cracking, reforming and polymerization of hydrocarbons; alkylation, for example, alkylation of isoparaffins with olefins such as of isobutane with ethylene to give diisopropyl, or the alkylation of aromatics with olefins such as of benzene with ethylene to give ethyl benzene which is an intermediate in the manufacture of styrene; and various condensation reactions of the Friedel-Crafts type. A particularly important process commercially is the isomerization of saturated hydrocarbons, that is, paraffins and naphthenes. By way of example, the vapor phase isomerization of normal butane to isobutane over a bauxite-aluminum chloride catalyst will be described. Application of the principles of the invention to other conversions and/or catalysts will be apparent to one skilled in the art. The invention is likewise applicable in certain of its aspects to the non-catalytic treatment of fluids, organic or inorganic, such as the adsorption or reaction of one component of a liquid or vapor. For example, the removal of small amounts of oxygen from a gas by reaction with a solid or liquid reducing agent impregnated on a solid adsorbent may be carried out in accordance with the procedure disclosed herein.

Giving particular attention to reactions catalyzed by aluminum chloride, it has been found that while many solid materials are suitable as supports for aluminum chloride or other metal halide catalysts, some are much superior to others. In general, the better the adsorptive properties of the support, the better the resulting catalyst. Thus, partially or completely dehydrated adsorbents such as bauxite, silica gel, "activated alumina," or fuller's earth, are quite satisfactory. Activated charcoal, pumice, and other adsorbents may also be used. Even non-adsorbent materials, such as porcelain chips, may be used with some success.

In effecting reactions over a supported aluminum chloride catalyst, the activity of the catalyst gradually declines with use due to the formation of aluminum chloride-hydrocarbon complexes and the loss of aluminum chloride from the catalyst by sublimation into the vaporous reaction mixture. One of the most effective manners of operating found to date comprises initiating the reaction with a fresh catalyst at as low a temperature as possible, gradually increasing the temperature to maintain conversion constant, and then after the maximum permissible temperature is obtained, stopping the conversion and reimpregnating the catalyst support with additional amounts of fresh aluminum chloride. This impregnation is best accomplished by passing the vaporized hydrocarbon feed through a body of solid aluminum chloride to sublime the same and then passing the resultant aluminum chloride-rich vapors through the catalyst bed wherein the aluminum chloride is adsorbed by the catalyst support. In general, the presence of a catalyst activator, usually hydrogen chloride, is essential to the reaction. The conversion is stopped as aforesaid by stopping the admixture of the hydrogen chloride with the feed stream. After the sublimation is completed, the hydrogen chloride is again introduced into the feed and the conversion resumed.

In a preferred embodiment, bauxite activated by dehydration, for example, the material available under the trade name of "Porocel," is placed in a reaction chamber, and anhydrous aluminum chloride is sublimed onto the "Porocel" in an amount which may range from 1 to 10 per cent by weight based on the "Porocel." This sublimation is accomplished by vaporizing the aluminum chloride in a stream of hot gaseous butane and passing the resulting mixture through the "Porocel" bed at about 300° F. The "Porocel" adsorbs the aluminum chloride, and catalyst activity is maintained by periodic repetitions of the sublimation period. By operating in this manner a very long catalyst life is realized. In the case of butane isomerization, the catalyst chamber needs to be dumped only once every few months, unless the catalyst is accidentally poisoned by the inclusion of olefins or heavy hydrocarbons in the feed.

When the time for subliming has arrived, the hydrogen chloride is cut out of the feed and a purge period may be used to remove most or all of the hydrogen chloride from the reaction chamber before starting sublimation. The sublimation is best carried out without appreciable change of temperature from that used just prior, at the end of the conversion part of the cycle. After the desired amount of aluminum chloride is sublimed into the catalyst chamber, the temperature of the feed stream is reduced to the value at which it is desired to initiate the next conversion period. This temperature is ordinarily much lower than the maximum attained at the end of a conversion period.

It is difficult or impossible to effect sublimation in the presence of HCl because of excessive sludge formation both in the subliming chamber and the catalyst chamber itself. However, its absence during the extended sublimation period leaves the catalyst quite free from HCl, and when this promoter is finally reintroduced into the butane feed after sublimation is completed, there is a considerable time lag or "induction period" before appreciable conversion is noted. Apparently it is necessary for the solid catalyst to adsorb a certain amount of hydrogen chloride before the reaction can start. A period of one or more days may elapse in commercial operations before the conversion rate attains its normal value. This delay in "kicking off" of course represents a considerable economic loss.

The delay in establishment of conversion after a sublimation may also be aggravated by poor distribution of aluminum chloride within the catalyst bed. By the customary practice of leading aluminum chloride-rich vapors into the bottom of the bed of adsorbent, it is inevitable that the bulk of the aluminum chloride will deposit out in the lower section of the bed. The result is an inadequate impregnation of the upper bed portions, with resultant low catalytic activity. It requires a considerable period of conversion to effect distribution of part of the excess catalyst from the lower to the upper parts of the bed.

Other disadvantages are inherent in the hither-to-known methods of carrying out the impregnation and conversion steps. Since the fresh reactants first come into contact with the lower or inlet sections of the catalyst, any feed impurities, such as olefins, heavy oils, and sulphur compounds, react with catalyst therein with resultant formation of "sludge" or "complex." During the impregnation step this sludge, which has a high affinity for aluminum chloride, absorbs most or all of the aluminum chloride vapors from the sublimation stream, thus further increasing the amount of $AlCl_3$ at the bottom and diminishing that available for the top of the reactor. In turn, the high $AlCl_3$ content at the bottom encourages over-action and cracking during conversion with consequent further formation of sludge. A concentration of catalyst in one part of the bed also results in hot spots and runaway reactions which are difficult to control and which cause overheating and cracking and diminished catalyst life. A severe pressure drop across the lower section of the catalyst bed is also developed, which greatly reduces permissible flow rates.

In the actual step of impregnating the support with sublimed aluminum chloride, certain difficulties are presented. For instance, it is possible to pass the subliming vapors through the catalyst bed at such a rate that not all the aluminum chloride is adsorbed, and some leaves the catalyst chamber in the chamber effluents. Accordingly, the rate of flow must be carefully watched, and a decrease in time required for impregnation cannot be effected by the apparently simple expedient of increasing the flow rate. The afore-mentioned tendency of the $AlCl_3$ to deposit mostly at the inlet of the bed of adsorbent results in excessive pressure drop, and uneven impregnation. The deposited aluminum chloride may be redistributed by continued flow of hot vapors essentially free from aluminum chloride which cause the deposited aluminum chloride to migrate into the upper portions of the bed, but this is a wastefully slow process.

An object of this invention is to provide improvements in the impregnation of solid adsorbents and/or in the treatment of fluids with such impregnated adsorbents. It is another object of the present invention to provide for the periodic reactivation of a supported metal halide catalyst. Another object of the invention is to effect the conversion of organic materials in the vapor phase with the aid of a Friedel-Crafts type metal halide catalyst activated by hydrogen halide. A further object is to isomerize normal butane to isobutane. Yet another object is to improve the distribution of aluminum chloride within a large bed of supported aluminum chloride catalyst. A further object is to reduce the delay in attaining full conversion rate after catalyst activator is reintroduced into the catalyst chamber subsequent to reactivation of the catalyst. Another object is to reduce pressure drop across a catalyst bed. Further objects and advantages of the invention will be apparent, to one skilled in the art, from the accompanying disclosure and discussion.

I have found that the foregoing objects may be attained by practicing what I choose to call "cross-sublimation." While it has previously been suggested to utilize several separate and independent beds of catalyst in series for conversion and in parallel for reimpregnation, the provision of such separate beds and the equipment necessary to allow the variations in connection required, impose very severe economic and procedural penalties. My method, on the other hand, is readily applied to a single, continuous bed of adsorbent material, and requires no complicated mechanisms for its operation. Hot vapors, comprising a carrying gas plus sublimed aluminum chloride, are introduced into one side of the bed of solid adsorbent at a plurality of points spaced along the length thereof, and $AlCl_3$-denuded vapors are withdrawn from the bed at one or more points which are opposite the inlet points but longitudinally displaced with respect to said inlet points so that a combination of cross flow and longitudinal flow is obtained. Preferably, to accomplish this cross-sublimation, the inlets and outlets are placed at such points that less solid adsorbent is interposed between a given inlet and a given outlet, i. e. the lineal distance therebetween is less, than between that given inlet and (1) a different outlet to which flow is undesired or (2) the principal reactor outlet. In this way, cross-flow is assured, and the bed of adsorbent itself serves to regulate direction and extent of flow.

In one important specific modification of my cross-sublimation, the cross-flow outlet manifold is ultimately re-introduced into an upper section of the bed of adsorbent, at a point which is more distant from the inlets than are the various outlets from the inlets, so that the vapors which have passed across and through the catalyst bed finally pass through the upper portion of the adsorbent, which is relatively poor in aluminum chloride, to insure complete or substantially complete removal of residual aluminum chloride vapors from the carrying gas by adsorption on the solid adsorbent.

One arrangement of apparatus and flow of materials therethrough, suitable for the practice of my invention, is shown diagrammatically in the accompanying drawing. It will be appreciated that numerous auxiliary items of equipment, such as pumps, blowers, temperature and rate-of-flow controllers, and the like, are not shown for the sake of simplicity, as they may readily be supplied by one skilled in the art in view of the disclosure herein of principles and preferred modes of operation.

In the drawing, which will be described with particular reference to the vapor phase isomerization of normal butane to isobutane in the presence of hydrogen chloride activator over a bauxite-AlCl₃ catalyst, the normal butane feed is introduced via line 10 for passage through vaporizer 12. The hot butane vapors continue through line 14, valve 16, superheater 18 (which is used only during subliming as will be described below), line 20, and valve 22 into the bottom of catalyst chamber 24. Anhydrous hydrogen chloride activator is introduced via line 26 and valve 28 into admixture with the butane just before entry of the butane into chamber 24.

Catalyst chamber 24 contains a single continuous bed of solid adsorbent such as dehydrated bauxite or other suitable catalyst support. Some aluminum chloride may be admixed therewith prior to the first use of the catalyst, or all of the aluminum chloride content of the reaction chamber may be sublimed from subliming chamber 30. The isomerization reaction is effected in the vapor phase at temperatures ranging from 200 to 400° F., and at superatmospheric pressures, such as 150 to 250 pounds per square inch gage. Total effluents leave the reaction chamber 24 through line 32 and valve 34 and are passed to a suitable separation means not shown. From the effluents are recovered hydrogen chloride which is recycled to line 26, isobutane product, unreacted normal butane which is recycled to line 10, and small amounts of light gases and of pentanes and heavier which are produced by side reactions. If desired, the gaseous effluents in line 32 may first be passed through a "guard chamber" containing a bed of solid adsorbent for removing traces of aluminum chloride, prior to fractionation. Ordinarily the reaction is commenced at a low temperature, for instance 240° F., and the inlet temperature is gradually raised as catalyst activity declines until a maximum temperature of, say, 300° F. is reached. When the extent of conversion drops off at this maximum temperature the conversion period is considered complete and the catalyst is reactivated by sublimation.

When a conversion period has been completed, valve 28 is closed, stopping the flow of HCl into the catalyst chamber. The chamber may be purged by flow of HCl-free butane feed therethrough for a time if desired. Valve 16 is then at least partially closed and valve 36 in line 38 is opened to allow flow of hot butane vapors through subliming chamber 30. This chamber has been previously filled through man hole 40 with lumps of anhydrous aluminum chloride. The aluminum chloride sublimes into the hot butane gas and is carried thereby via lines 41 and 20 toward the catalyst chamber 24. If desired, superheater 18 in line 14 may be employed to increase the temperature of the aluminum chloride-rich gas, and the thus-superheated butane also serves to dilute this gas. In this way condensation of aluminum chloride in the line 20 and other lines leading into the catalyst chamber is minimized or avoided and a more satisfactory impregnation of the catalyst is accomplished. However, flow of butane through valve 16 and superheater 18 is optional.

In carrying out the sublimation, valve 22 may be completely closed, or only partially closed so as to allow some flow of impregnating vapors into the bottom of the catalyst bed. In any event, most of the aluminum chloride-rich butane vapors pass into line 42 and thence into one side of catalyst chamber 24 at a plurality of longitudinally spaced points represented by line 44 controlled by valve 46 and line 48 controlled by valve 50, entering, respectively, at points A and C. On the opposite side of chamber 24 are one or more outlet points such as B and D from which the butane carrying gas is withdrawn, as by line 52 controlled by valve 54 and line 56 controlled by valve 58. Most of the aluminum chloride has been adsorbed by the bauxite in chamber 24, and the denuded vapors flow into outlet manifold 60. It will be noted that outlet points B and D are not only on opposite sides of chamber 24 from inlet points A and C, but are also separated longitudinally therefrom. The locations of the various points are selected so that the distance AB is less than the distance AD or AE (E being the outlet end of the catalyst bed). This causes most of the vapors introduced at point A to flow across and down through the body of adsorbent and out at point B. The distance CD is likewise shorter than the distance CB or CE so that most of the vapors introduced at point C flow across and longitudinally through the body of catalyst to exit point D. The flow of vapors is indicated diagrammatically in the drawing by arrows. If it is desired to sublime some aluminum chloride into the bottom section of the chamber 24, then valve 22 is left partially open and vapors flow therethrough into the bottom of the catalyst bed and out the point B. It will be appreciated that more or less points may be used as desired, depending upon the size and the shape of the catalyst chamber, the mesh size of the bauxite particles, and other factors.

While outlet manifold 60 may be connected directly with outlet line 32 by means of line 62 and valve 64, vapors therefrom are preferably led through line 66 and valve 68 into the upper section of chamber 24 at a point such as F. While line 66 is shown entering at point F on the side of the chamber, it may if desired be extended into the center of the body of catalyst. The location of re-entry point F is chosen, however, so that the distances CF and AF are greater than the distances CD and AB, and so that the distances CD plus FE and AB plus FE are less than the distance CE. In this way the resistance to flow of the catalyst particles between points C and F is greater than between points C and D and consequently the vapors introduced at the side of the chamber flow across to the outlet points and thence through manifold 60 and line 66 back into the upper portion of the catalyst bed. Likewise, flow from C to E is minimized. The vapors finally leave the catalyst bed at its upper end E and exit via line 32. The upper portion of the catalyst bed is considerably freer of aluminum chloride than the lower sections, and serves to adsorb residual aluminum chloride from the vapors introduced from outlet manifold 60 at point F. In this way the butane vapors finally withdrawn through line 32 are substantially completely free from aluminum chloride.

From the foregoing it will be clear that the catalyst bed within chamber 24 is more evenly impregnated with aluminum chloride than when it is sublimed in the usual manner entirely into the bottom through valve 22. This more even distribution insures a more active catalyst when the bed is returned to conversion service and minimizes the excessive deposition of the aluminum chloride with consequent sludge at the bottom of the bed. It is unnecessary to attempt an absolutely even flow of impregnated gases within the chamber 24 as the subsequent flow of butane vapors through the active catalyst bed during the conversion part of the cycle effects a certain amount of migration and redistribution of aluminum chloride within the chamber.

If desired, distributing means, such as perforated pipes in the form of horizontal arcs attached to the inlet ends of pipes 44 and 48, may be used within the catalyst chamber 24 in order to get a better distribution of inlet vapors along the side of the chamber for flow across and through the chamber. Similar means may be attached to the outlet pipes 52 and 56 if desired. While not shown on the drawing for the sake of simplicity, I prefer to have at least one other set of inlets and outlets displaced from those shown by from 90 to 180° around the periphery of the chamber. This additional set or sets of inlets and outlets may be used instead of the ones shown as desired in order to give a more even pattern of distribution of aluminum chloride within the chamber over a series of several subliming steps. One convenient means of accomplishing this is merely to interconnect inlet line 42 with outlet line 60 in such a way that their functions may be reversed, with the impregnating vapors entering at B and D and leaving at A and C.

In operation, a freshly sublimed catalyst is placed on stream for conversion with a butane inlet temperature preferably of about 240° F. Hydrogen chloride, which may range from less than 1 up to say 5 per cent of the butane feed, is mixed with the feed and a few hours time is allowed for conversion to begin. If necessary at that time, the temperature may be raised from 5 to 10° F. to hasten the attainment of full conversion rate. While with the ordinary methods of sublimation at least 24 hours frequently is required to attain full conversion, by means of cross-subliming in the manner above described this "induction period" is greatly reduced. Ordinarily from 35 to 45 per cent conversion per pass is considered optimum. When operating with a 4' diameter by 45' reaction chamber containing about 10 tons of Porocel, a temperature gradient from the inlet to the outlet of the catalyst chamber of about 40° F. is established under these conditions. This rise in temperature is due to the exothermic heat of the isomerization reaction. As the conversion proceeds, catalyst activity declines and the feed temperature is gradually increased to a maximum of about 300° F. to maintain the rate of conversion. As soon as the conversion falls appreciably below 35 per cent at the maximum temperature, the conversion period has been completed. This part of the cycle ordinarily runs for from 10 to 20 days, though it may be shorter or longer depending upon the accumulative effect of various factors.

At the end of the conversion period the hydrogen chloride is bypassed down-stream of the reaction chamber, so that it continues to flow through the system to avoid the disruption of the fractionator operation, but does not pass through the reactor. If desired the catalyst chamber may be purged of HCl by continuing flow of hot butane feed for a few hours, although this is not now considered essential. The hot butane feed, still at 300° F., is then directed through the subliming chamber, and the resulting aluminum chloride-rich stream is then used to cross-sublime the catalyst bed as described hereinbefore. If desired, part of the butane may be by-passed around the subliming chamber 30. Due to the efficiency of the cross-sublimation method a greatly reduced flow rate may be used for subliming as compared with the flow rate during conversion. While in the ordinary method of subliming into the bottom only of the catalyst bed, the butane flow rate must be maintained at or near the flow rate used during the conversion portion of the cycle in order to force the aluminum chloride into the middle and upper portions of the catalyst bed, I may cut the subliming flow rate to 50 per cent or less of the conversion flow rate with satisfactory results. A period of a few hours is required to sublime about 1 or 2 per cent aluminum chloride, based on the weight of the Porocel, which is ordinarily adequate to reactivate the catalyst to the optimum extent.

Upon completion of the sublimation period, the normal butane feed temperature is reduced to 240° F. and the feed vapor proceeds directly into the reaction chamber. As soon as the effluent temperature of the reaction chamber drops 10 or 15° F. it is assumed that the Porocel bed is cool enough for injection of HCl, at which time the HCl recycle stream is turned into the reaction chamber. From this point the conversion period proceeds as previously described.

Conversion effluents are ordinarily first passed to a fractionator which serves as a stripper of hydrogen chloride, and then to another fractionator for separation of isobutane from normal butane. The HCl recycle, consisting of approximately 50 per cent HCl, leaves the top of the HCl stripper at 110° to 130° F. and the rate is controlled by a rate of flow controller which is reset slowly by a diaphragm actuated by stripper column pressure. The HCl stripper column bottoms, consisting of propane fed into the system and made in the system, isobutane, unreacted normal butane, and pentanes and heavier fed into the system and made in the system, proceeds through a water cooler to conventional caustic treating and to fractionation for segregation of the mentioned components. The unconverted normal butane plus make-up normal butane is fed to the reaction chambers through Porocel driers to insure an absolute minimum of water entering the system, and then through the vaporizer and to the reaction chambers.

While it is preferred to use as the carrying gas the organic vapor to be converted, other gases, such as hydrogen or nitrogen or an organic vapor different from that being converted, may be used to sublime and carry the metal halide into the catalyst.

It will be appreciated that the catalytic process described is merely exemplary, and that other materials, conditions and modifications may be used as warranted by any particular situation involving the catalytic or non-catalytic treatment of fluids with impregnated contact masses.

I claim:

1. The method of impregnating a single elongated continuous unobstructed body of contiguous solid adsorbent particles with a vaporizable non-gaseous treating agent, said body being used subsequent to said impregnation by longitudinal flow therethrough of a fluid for treatment by the said treating agent impregnated on the adsorbent, which comprises vaporizing said treating agent into a carrying gas, flowing the thus enriched gas into one side of said body at a plurality of points spaced along the length thereof, withdrawing partially denuded gas from at least one point on the opposite side of said body and spaced longitudinally from said inlet points, thereby effecting transverse and longitudinal flow of gas within said body and adsorption of said treating agent from said carrying gas, reintroducing said partially denuded gas into said body of adsorbent at a point removed from the aforesaid points toward one end of said body to effect adsorption of residual treating agent from said gas by the adsorbent, and withdrawing carrying gas from said end substantially completely denuded of treating agent, said points being so located that the distances from the inlet points to the outlet point are less than the distances from said inlet points to said end and less than the distances from said inlet points to said point of reintroduction.

2. In the catalytic conversion of organic reactants by passing same through a single elongated continuous unobstructed bed of Friedel-Crafts type metal halide catalyst supported on contiguous particles of a solid adsorbent material, wherein the catalyst becomes deactivated with use and is periodically reactivated by stopping the conversion and impregnating the bed of particles with additional quantities of fresh metal halide by adsorption of said fresh metal halide from a gaseous stream comprising a carrying gas and metal halide vapors, the improved method of effecting said impregnation to give a more even distribution of metal halide throughout said elongated bed which comprises introducing said gaseous stream into a side of said bed at a plurality of points spaced along the length thereof for flow transversely across said bed, withdrawing said gaseous stream at least partially denuded of metal halide vapors from at least one point on the opposite side of said bed from said inlets, said withdrawal point being longitudinally displaced with respect to said inlets to insure longitudinal as well as cross flow of said gaseous stream through said bed and being closer to said inlets than is the outlet end of said elongated bed.

3. The improved method of isomerizing normal butane to isobutane which comprises passing a stream of hot vaporous normal butane admixed with catalyst-activating amounts of anhydrous hydrogen chloride from the inlet end to the outlet end of a single elongated continuous unobstructed bed of catalyst comprising contiguous solid adsorbent particles impregnated with anhydrous aluminum chloride at isomerization conditions to produce isobutane, continuing the passage of said stream until catalyst activity declines to an uneconomic level, stopping the admixture of hydrogen chloride with said stream, passing at least a portion of said stream through a body of solid aluminum chloride to sublime same into said hot vaporous butane stream, passing not more than a minor portion of the resulting $AlCl_3$-rich stream into the inlet end of said elongated bed, passing at least the major portion of said $AlCl_3$-rich stream into one side of said elongated bed at at least one introduction point between said inlet and outlet ends, withdrawing at least part of said stream at least partially denuded of aluminum chloride by adsorption of same by said adsorbent particles from at least one withdrawal point on a side of said bed opposite said introduction point and displaced longitudinally with respect thereto, thereby effecting flow of impregnating vapors transversely and longitudinally through said elongated bed, continuing the flow just described until sufficient fresh aluminum chloride is adsorbed by said catalyst to reactivate same to a desired extent, stopping the sublimation of aluminum chloride in said stream and flow of said stream into said introduction point, admixing hydrogen chloride with said stream of hot vaporous normal butane and again passing the resulting admixture through said elongated bed from the inlet end to the outlet end thereof at isomerization conditions including a temperature and flow rate adequate to cause some migration of aluminum chloride within said catalyst bed further distributing deposited aluminum chloride throughout said bed, and continuing the cycle of isomerization and impregnation steps as described.

4. The method of claim 3, further characterized in said impregnation step by returning said withdrawn stream partially denuded of aluminum chloride into said elongated bed at a point between the outlet end of said bed and said point of introduction and point of withdrawal, and more distant from said point of introduction than is said point of withdrawal, passing same through said elongated bed to the outlet end thereof to adsorb residual aluminum chloride from said withdrawn stream and to deposit said residual aluminum chloride in the outlet portion of said catalyst bed, and withdrawing from the outlet end of said bed a stream of vaporous butane substantially free from aluminum chloride.

HERBERT H. JONES.

REFERENCES CITED

The following references are of record in the file of this patent:

UNITED STATES PATENTS

| Number | Name | Date |
|---|---|---|
| 2,306,011 | Burk et al. | Dec. 22, 1942 |
| 2,395,263 | Foster | Feb. 17, 1946 |
| 2,399,883 | Myers | May 7, 1946 |
| 2,403,181 | Jones | July 2, 1946 |
| 2,406,477 | Solomon et al. | Aug. 27, 1946 |